Sept. 10, 1946. M. L. MEYER 2,407,377
TILTABLE TRAP CHAMBER MEASURING DISPENSING DEVICE
Filed Oct. 1, 1945
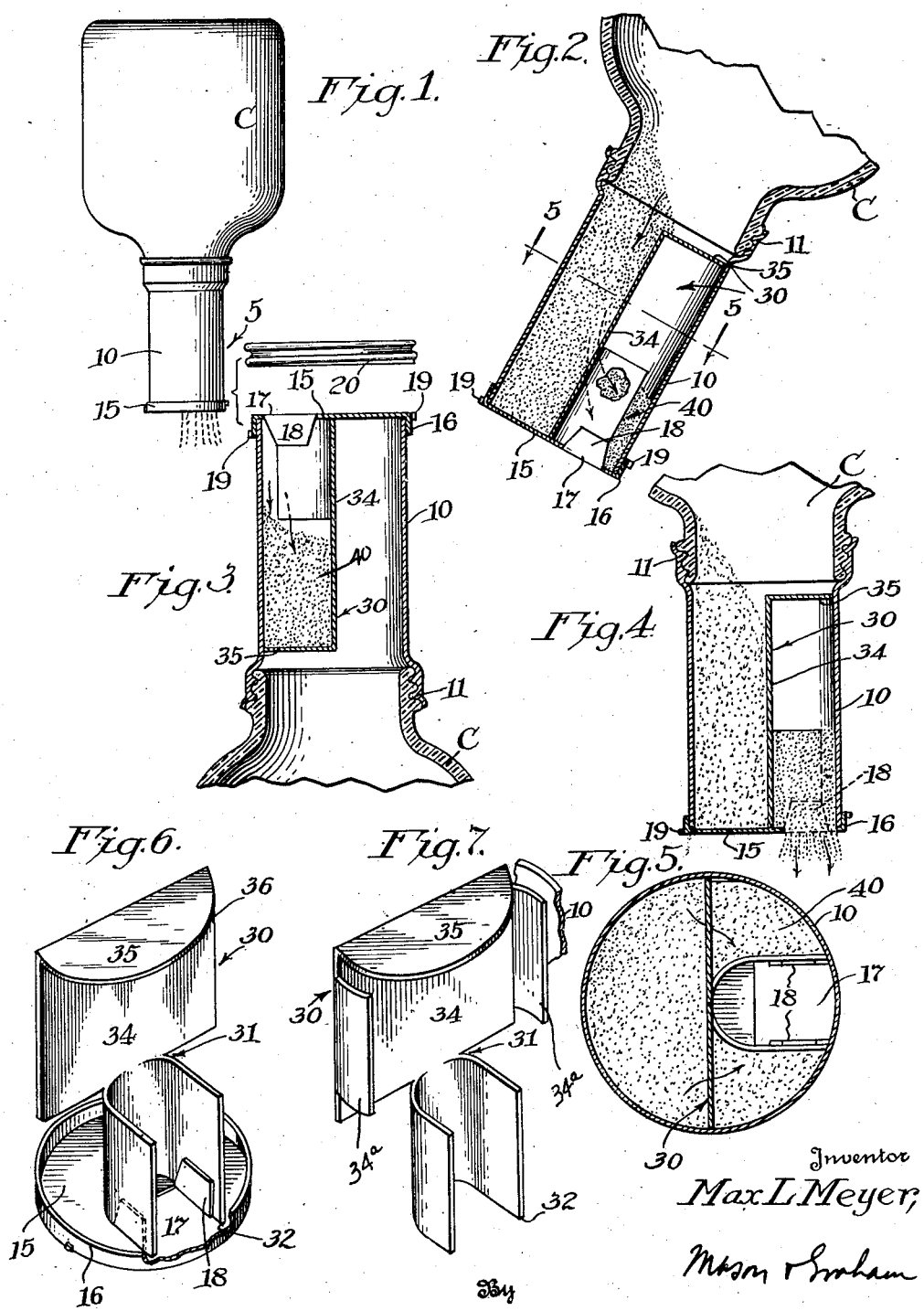
Inventor
Max L. Meyer Patented Sept. 10, 1946

2,407,377

UNITED STATES PATENT OFFICE 2,407,377

TILTABLE TRAP CHAMBER MEASURING DISPENSING DEVICE

Max L. Meyer, Los Angeles, Calif.

Application October 1, 1945, Serial No. 619,447

2 Claims. (Cl. 222—455)

My present invention has to do with measuring dispensers for dispensing predetermined quantities of pulverulent material such, for instance, as ground coffee, sugar and the like; having as an object the provision of a simple, inexpensive device for such purpose, which may be substituted for the conventional cover lid of a container and used, when desired, to pour therefrom measured quantities of the contained material.

Another characteristic and novel feature of my invention resides in its simple and efficient construction which enables the measuring element to be stamped as a separate unit and readily attached in place to the end wall or to the side wall of the neck of my dispenser.

Other more specific objects and advantages will appear from the following detailed description of one presently preferred embodiment of the invention wherein I shall refer to the accompanying drawing, in which:

Fig. 1 is a side elevation showing one form of the device in pouring position;

Figs. 2, 3 and 4 are sectional views showing the device in various positions of use;

Fig. 5 is a section on line 5—5 of Fig. 2;

Fig. 6 is a perspective of the measuring element attached to the end wall; and

Fig. 7 is a perspective showing a modified form of measuring element.

I wish it understood, however, that my invention, in its broader aspects, as defined by the accompanying claims, is not intended to be confined to the specific details now to be described since it is susceptible of being carried out in other physical forms.

Referring now to the drawing I show at C a conventional container, such, for instance, as a glass jar containing ground coffee, upon the neck of which is mounted my dispenser unit generally denoted by the numeral 5.

Referring now more particularly to the dispensing unit, it is shown as comprising a cylindrical body portion 10 whose bottom end is of increased diameter and threaded at 11 to engage the conventional threaded neck of a container C.

The end wall or cap 15 is secured on the outer end of the body by its peripheral flange 16, and is provided with an opening 17 through which the material is finally dispensed. In forming the opening 17 I preferably leave tabs 18 integral with the wall and bend the tabs inwardly at right angles to the plane of the end wall, for the purpose to be described.

Preferably I provide on the flange 16 radial lugs 19 to engage the internal threads of a cover cap 20 which seals the dispenser when not in use and typically is merely the conventional cover cap normally carried by the container C and removed therefrom to mount my dispensing unit. Of course, the lugs are mere substitutes for threads and it will be understood that threads may be used in lieu of the lugs if desired. Preferably the exterior diameter of the flange 16 is equal to the exterior diameter of the neck of the container C to facilitate use of the cover cap normally carried by the container.

Within the body 10 I mount my measuring element generally denoted 30, which is shown attached to the end wall 15 in Fig. 6.

This measuring element consists of a sheet of metal or other suitable material slitted at its opposite sides as shown at 31. At one side of the slits, the sheet is bent into substantially semi-circular cross-section to provide a pouring throat 32 whose outer end is secured to the tabs 18 as by soldering or spot-welding; and the sheet portion at the other side of the slits is left flat, as shown at 34, except that at its inner end there is a right-angled flange portion 35 having a curved peripheral edge 36 of a curvature conforming to the inner surface of the cylindrical body 10. The portions 34 and 35, in conjunction with the side wall of the body, form a trap 40, the purpose of which will be later described.

When the end wall member 15 is mounted on the outer end of the cylindrical body, as by a friction fit or by soldering, the complete dispensing unit is formed and is shown in position on the container C as well as in various stages of use in Figs. 1 to 4.

The purpose, function and cooperation of the parts will perhaps be better understood from the following description of operation.

With the cover cap 20 removed, the container carrying my dispensing unit is first tipped as shown in Fig. 2, which causes the material in the container to flow into the body or neck member. Since the relative arrangement of the throat 32 and walls 34, 35 prevent the material from passing out through the opening 17 in this first tilting operation, a certain proportion of the material which flows into the body or neck will flow over the edges provided by the slits 31 and drop into the trap 40. Thus as the device is next righted, the material will be retained in the trap as shown in Fig. 3. Then as the device is next tilted, the material in the trap 40 will pour through the throat 32 and be finally discharged through opening 17 (Fig. 4), while in the same operation the trap 40 will again be refilled to be likewise dispensed during the next tilting operation.

In Fig. 7 I show a variational way of mounting the measuring element within the cylindrical body 10. Here at its opposite sides the wall 34 has curved flanges 34a which may be fixed to the side wall of the body 10 as by spot welding or soldering, the flanges conforming to the inner surface of the body.

I claim:

1. In a device for dispensing measured quantities of puverulent material from a container, a cylindrical neck member adapted to have its inner end secured on and in communication with the container neck, an end wall carried by the neck member, said end wall having a dispensing opening therein, and a measuring element within the neck member, said measuring element being formed of a plate having opposite slits opening through its side edges, the plate portion at one side of the slits being bent to form a delivery throat and the plate portion at the other side of the slits being disposed diametrically of the neck member and having an end flange presenting a peripheral edge conforming to and fitting against the inner surface of the neck member whereby to form a material trap communicating with the delivery throat, said throat being mounted in direct communication with the opening in said end wall.

2. In a device for dispensing measured quantities of puverulent material from a container, a cylindrical neck member adapted to have its inner end secured on and in communication with the container neck, an end wall carried by the neck member, said end wall having a dispensing opening therein, and a measuring element mounted within the neck member, said measuring element being formed of a plate having opposite slits opening through its side edges, the plate portion at one side of the slits being bent to form a delivery throat and the plate portion at the other side of the slit being disposed diametrically of the neck member and having an end flange presenting a peripheral edge conforming to and fitting against the inner surface of the neck member whereby to form a material trap, said throat being mounted in direct communication with the opening in said end wall, and said diametrically disposed portion of the plate having side flanges secured to the side wall of the cylindrical neck member.

MAX L. MEYER.